(12) United States Patent
Williams et al.

(10) Patent No.: US 10,949,407 B2
(45) Date of Patent: Mar. 16, 2021

(54) DATABASES TO STORE DEVICE HISTORY DATA

(71) Applicant: Hewlett-Packard Development Company, L.P., Houston, TX (US)

(72) Inventors: Kevin Williams, San Diego, CA (US); Amit Kumar Singh, Houston, TX (US); Gaurav Roy, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 185 days.

(21) Appl. No.: 15/883,049

(22) Filed: Jan. 29, 2018

(65) Prior Publication Data

US 2019/0236172 A1 Aug. 1, 2019

(51) Int. Cl.
*G06F 16/21* (2019.01)
*G06F 16/22* (2019.01)
*G06F 16/955* (2019.01)
*G06F 16/23* (2019.01)

(52) U.S. Cl.
CPC ............ *G06F 16/219* (2019.01); *G06F 16/22* (2019.01); *G06F 16/2379* (2019.01); *G06F 16/955* (2019.01)

(58) Field of Classification Search
CPC .. G06F 21/6227; G06F 16/00; G06F 11/3676; G06F 16/128; G06F 16/21; G06F 16/217
See application file for complete search history.

(56) References Cited

U.S. PATENT DOCUMENTS

| 7,979,410 | B2 | 7/2011 | Pattabhi et al. | |
|---|---|---|---|---|
| 8,930,410 | B2 | 1/2015 | Alton et al. | |
| 9,311,369 | B2 | 4/2016 | Pattabhi et al. | |
| 2002/0143943 | A1* | 10/2002 | Lee | H04L 63/0823 709/225 |
| 2011/0119131 | A1* | 5/2011 | Levi | G06Q 30/02 705/14.53 |
| 2017/0344495 | A1 | 11/2017 | Antonatos et al. | |
| 2018/0198616 | A1* | 7/2018 | Feather | H04L 9/3263 |

\* cited by examiner

*Primary Examiner* — Truong V Vo
(74) *Attorney, Agent, or Firm* — Perry + Currier Inc

(57) ABSTRACT

An example of an apparatus including a network interface to receive enrollment data from a device, wherein the device is identified by a device identifier. The apparatus further includes a memory storage unit connected to the network interface. The memory storage unit receives device history data associated with the device identifier while the device is enrolled. The memory storage unit is also to maintain a database to store the device history data associated with the device identifier. The apparatus also includes a processor to receive a de-enrollment command associated with the device via the network interface. The de-enrollment command causes the processor to modify the device identifier stored in the database.

15 Claims, 4 Drawing Sheets

600

| Device Identifier (605) | Enroll Date (610) | Date (615) | Status (620) | Owner (625) |
|---|---|---|---|---|
| A123 | 1/12/2017 | 1/12/2017 | active | Jeff |
| A123 | 1/12/2017 | 1/16/2017 | inactive | Jeff |
| A123 | 1/23/2017 | 1/23/2017 | active | Betty |
| A123 | 2/3/2017 | 2/3/2017 | active | Susie |
| A123 | 2/14/2017 | 2/14/2017 | active | Dan |

| Device Identifier (605) | Enroll Date (610) | Status (620) | Modified Device Identifier (605') |
|---|---|---|---|
| A123 | 1/12/2017 | active | A123.1 |
| A123 | 1/23/2017 | Inactive | A123.2 |
| A123 | 2/3/2017 | active | A123.3 |
| A123 | 2/14/2017 | active | A123 |

Fig. 4B

| Modified Device Identifier (605') | Enroll Date (610) | Date (615) | Status (620) | Owner (625) |
|---|---|---|---|---|
| A123.1 | 1/12/2017 | 1/12/2017 | active | Jeff |
| A123.1 | 1/12/2017 | 1/16/2017 | inactive | Jeff |
| A123.2 | 1/23/2017 | 1/23/2017 | active | Betty |
| A123.3 | 2/3/2017 | 2/3/2017 | active | Susie |
| A123 | 2/14/2017 | 2/14/2017 | active | Dan |

DATABASES TO STORE DEVICE HISTORY DATA

BACKGROUND

Data may be stored in computer-readable databases. These databases may store large volumes of data collected over time. Processing large databases may be inefficient and expensive. Computers may be used to retrieve and process the data stored in databases.

BRIEF DESCRIPTION OF THE DRAWINGS

Reference will now be made, by way of example only, to the accompanying drawings in which:

FIGS. 4A-C are examples showing the application of a method to data.

DETAILED DESCRIPTION

Figure 1:
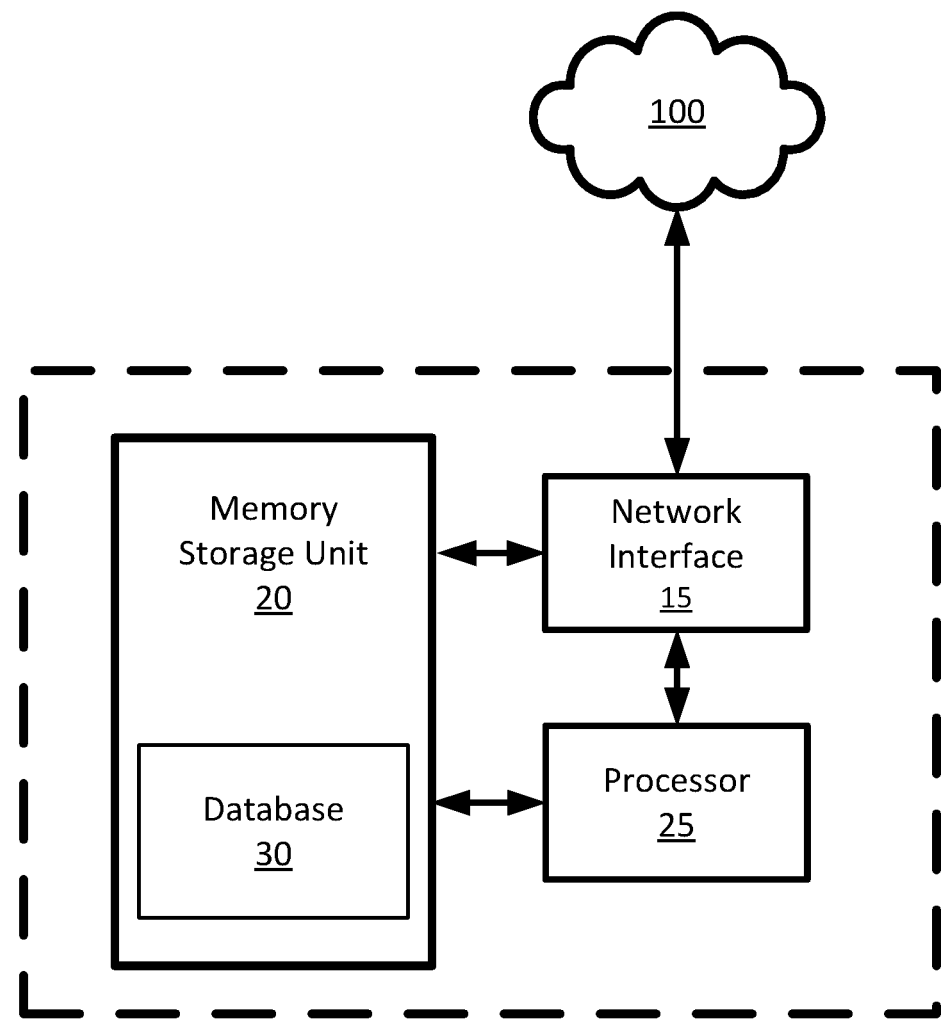
FIG. 1 is a block diagram of an example apparatus.
Figure 1:

Increasing volumes of data create increased complexity when storing, manipulating, and assessing the data. For example, with increases in the connectively of devices and the amount of data relating to the devices stored for reporting, the generated data is increasingly voluminous and complex.

Complexity in retrieving and manipulating datasets may arise from the complex data structures of systems, system components, and component attributes and their corresponding values. In addition, such complexity may arise from the large volumes of data generated by systems managing a large number of devices, such as in a device as a service system. For example, data in a device as a service system is typically stored in a database. In such a system, devices often switch users through enrollment and de-enrollment. Since a device identifier is generally hardwired into a device, switching users by re-enrollment would not generate a new device identifier. Accordingly, new data collected after re-enrollment may be corrupted by existing data in the database with the same device identifier from a prior enrollment.

As a specific example, when an organization has electronic devices to manage, it is likely that devices are tracked and logged by a central system. In this example, the users of the devices would need to be tracked and data from the devices from use may be logged for monitoring and/or auditing purposes. The member of the organization may periodically change devices, such as a move to a new role within the organization, or a hardware upgrade. When the member changes devices, the old device may be passed onto another member of the organization. Accordingly, the data associated with the device would need to be separated between the two members or users. Since the device is identified by a device identifier, such as a serial number, storing all data associated with the device in a single unified database is difficult since data between the two users may corrupt the database or overwrite the historical information.

As another example, a developer or administrator may want to test features or new functionality of the central device tracking system. To do so, the developer or administrator may need to track and log a large number of devices. Since the device identifier is typically fixed, a large number of devices would need to be acquired for this purpose which may be prohibitively expensive.

As described herein, a database to store device history data may be implemented to manage a device in an organization, to maintain data integrity, and to preserve device history data for the device through multiple enrollments. For example, the database stores data associated with the device identifier during an active enrollment. Once the device is de-enrolled (i.e. returned to the company by the user) or re-enrolled (i.e. provided to a new user), the device identifier in the database for the prior session is modified to a unique identifier that may be mapped back to the device. Accordingly, prior data would be associated with the modified identifier and new data collected from the new enrollment would be associated with the device identifier to keep the device history data from the two users separate and to avoid data conflicts within the database.

Referring to FIG. 1, an apparatus to modify, generate, and transform data in large datasets is generally shown at 10. The apparatus may include additional components, such as various memory storage units, interfaces to communicate with other computer apparatus or devices, and further input and output devices to interact with a user or another device. In the present example, the apparatus 10 includes a network interface 15, a memory storage unit 20, and a processor 25.

The network interface 15 receives enrollment data from a device via a network 100. In the present example, the network 100 may provide a link to a device, such as a client device of a device as a service system to send and receive data. It is to be appreciated that the enrollment data is associated with a specific device and the data received includes a device identifier that is specific to the device. The device identifier is not particularly limited and may be a serial number, a media access control address, or a number assigned by the device as a service system unique to the device. The network interface 15 may be a wireless network card to communicate with the network 100 via a WiFi connection. In other examples, the network interface 15 may also be a network interface controller connected to via a wired connection such as Ethernet.

The data received from the device is not particularly limited and may include data associated with a device, such as device history data, that is managed by a device as a service system to manage multiple devices. In this example, the device management system may handle a large amount of data to log and monitor several devices as part of a device as a service system. For example, the data may provide information to log when a device enrolls with the device as a service system. The data may also provide information about a device activation or other event associated with the device. The device as a service system is not limited to management of a single device and may track and record information about multiple devices to generate reports.

It is to be understood that enrollment and activation are generally not equivalent. Enrollment of the device relates to the addition of the device to the device as a service system for use. For example, the enrollment of the device may generally be carried out by a separate system and the enrollment data being provided to the device reporting system. The enrollment system of the device as a service system may be closely associated with subscriptions and other financial aspects of the device as a service system. Accordingly, the enrollment system may not be fully accessible to the device reporting system, such as to restrict writing functions to the enrollment database. Activation of the device relates to the administration of the device once enrolled. For example, a device on the device as a service system may be deactivated when functionality of the device is stopped, such as by an administrator. The functionality of a device may be stopped in situations such as a lost device, or when a user leaves the company.

Before the device is re-enrolled with the device as a service system, such as when the device is re-assigned to a new user, the device is expected to be deactivated and de-enrolled. However, in some instances, the device is transferred to a new user without deactivation or de-enrollment. In such cases, the device may be deemed to have been deactivated and de-enrolled prior to the re-enrollment as discussed in more detail below.

In the present example, the device history data provided to the device as a service system may include information about each managed device. The information received is not limited and may include data about the device such as a device identifier, manufacturing information, or service dates. In other examples, the information may include a model name, device name, warranty information, service information, support information, or system crash information in the device as a service system. Comparable information may be collected in other types of systems other than device as a service systems.

The data handled by the apparatus 10 is not necessarily limited to data used in a device as a service system. Other examples where the apparatus 10 may be used include complex systems with multiple components where a central server collects data from the components and manages the components, such as automatic data collection systems including an Internet of Things schema, where devices self-report various data collected by sensors. For example, other systems may include an automobile parts logging system, a system to store data about a human body or other biological system as represented in an electronic medical record (EMR), or DNA/RNA if encoded proteins or DNA/RNA segments which contain specific genes which may be considered components.

The memory storage unit 20 is in communication with and connected to the network interface in this example. The memory storage unit 20 is configured to receive data via the network interface such as the device history data associated with a device when the device is enrolled with the apparatus 10. In the present example, the memory storage unit 20 may include a non-transitory machine-readable storage medium that may be electronic, magnetic, optical, or other physical storage devices.

In the present example, the memory storage unit 20 maintains a database of device history associated with a device identifier as well as instructions to operate the apparatus 10. In addition, the memory storage unit 20 may store an operating system that is executable by the processor 35 to provide general functionality to the apparatus 10. For example, the operating system may provide functionality to additional applications. Examples of operating systems include Windows™, macOS™, iOS™, Android™, Linux™, and Unix™. The memory storage unit 20 may additionally store instructions to operate at the driver level as well as other hardware drivers to communicate with other components and peripheral devices of the apparatus 10 (not shown).

The processor 25 is in communication with the network interface 15 and the memory storage unit 20. The processor 25 may include a central processing unit (CPU), a microcontroller, a microprocessor, a processing core, a field-programmable gate array (FPGA), an application-specific integrated circuit (ASIC), or similar. In the present example, the processor 25 may cooperate with a memory storage unit 20 to execute various instructions. For example, the processor 25 may maintain and operate various applications with which a user may interact. In other examples, the processor 25 may send or receive data, such as input and output during the operation of the device as a service system.

In the present example, the processor 25 receives a de-enrollment command associated with the device from the network interface 15 via the network 100. The source of the de-enrollment command is not limited and may be from the device itself to de-enroll itself from the device as a service system. In other examples, the source of the de-enrollment command may be from an administrative device. As another example, the de-enrollment command may be generated by the processor 25 upon receiving a re-enrollment command for an active device. Once the de-enrollment command is received, the processor 25 modifies the device identifier associated with the device stored in the database 30.

Figure 2:
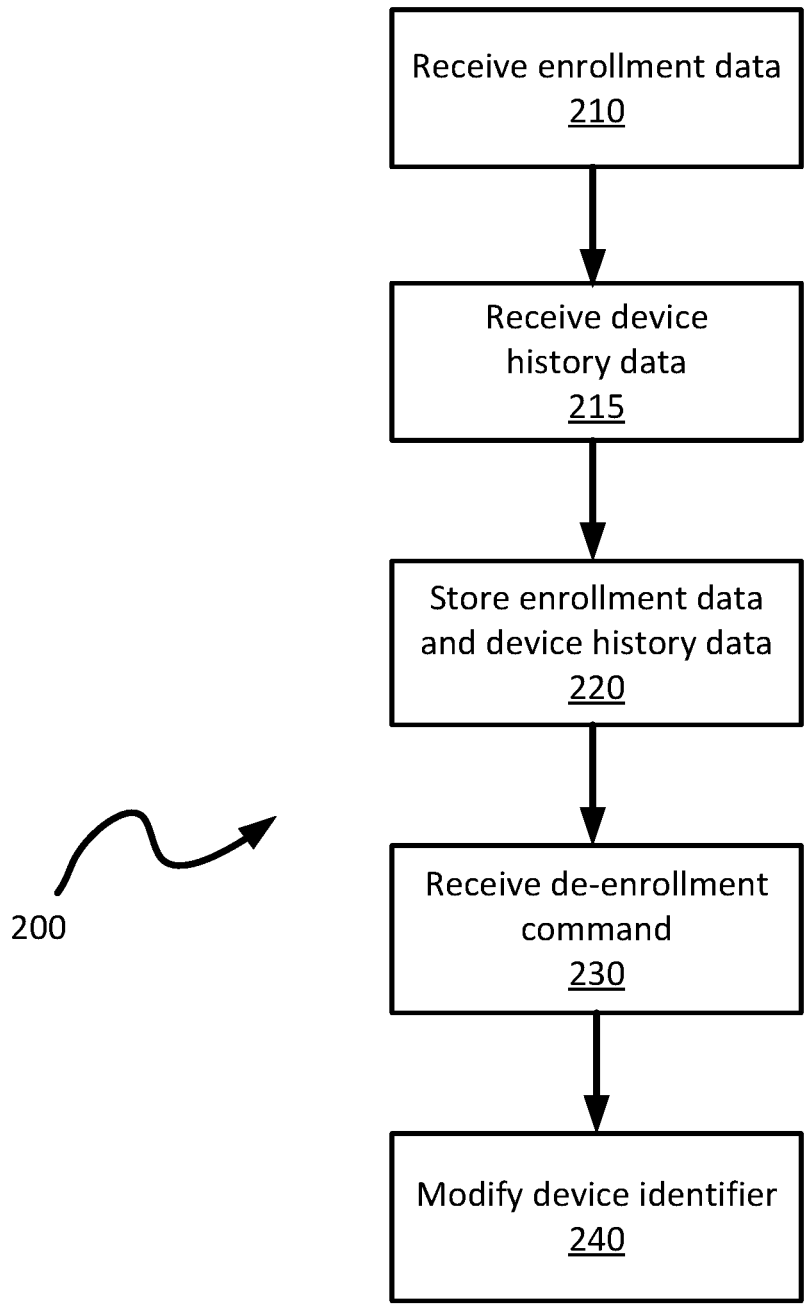
FIG. 2 is a flowchart of an example of a method.

Referring to FIG. 2, a flowchart of an example method to modify, generate, and transform data in large datasets is generally shown at 200. In order to assist in the explanation of method 200, it will be assumed that method 200 may be performed with the apparatus 10. Indeed, the method 200 may be one way in which apparatus 10 may be configured. Furthermore, the following discussion of method 200 may lead to a further understanding of the apparatus 10 and its various components. In addition, it is to be emphasized, that method 200 need not be performed in the exact sequence as shown, and various blocks may be performed in parallel rather than in sequence, or in a different sequence altogether.

Beginning at block 210, the apparatus 10 receives enrollment data from a device identified by its device identifier via the network interface 15. Next, at block 215, the apparatus 10 receives device history from the device. For example, the device history data may include a list of events such as activations and deactivations of the device, the date or time of the event, along with the device identifier associated with the event. Other examples of device history data may include data that may describe the state specific status of the device. Although the present example shows the device history data to be received separately from the enrollment data, it is to be appreciated that the device history data and enrollment data may be received together in a single step in some examples. In another example, device history data may be included in the enrollment data from the enrollment system in addition to device history data being received directly from a device.

Block 220 stores the enrollment data and the device history data received in block 210 into the database 30 maintained in the memory storage unit 20. In the present example, the device history data comprises data associated with an event and the device identifier associated with the event. The event along with the device identifier are stored into a data record on the database 30, such as a row of a spreadsheet. In the present example, it is to be appreciated that the apparatus 10 may receive device history data from multiple devices. Accordingly, each event of the device history data may be stored as a separate data record in the database 30.

The manner by which the device history is stored in the database 30 is not particularly limited. In the present example, the data for all devices managed by the apparatus 10 is stored in a single database 30. The database 30 consolidates data from devices managed by the apparatus into a single database which may enhance the performance of the device as a service system due to efficiencies that are not possible when separate databases and tables are to be maintained. For example, the single database 30 may be language independent which allows for compatibility with many different programming languages such that the data may be manipulated with the different programming languages.

Block 230 receives a de-enrollment command for a device. In the present example, the de-enrollment command is received from via the network interface 15 from the network. In the present example, the de-enrollment command includes a device identifier of the device to be deactivated and de-enrolled. The source of the de-enrollment command is not particularly limited, and the command may be received from the device itself if a user of the device intends to de-enroll the device. It is to be understood that once a device is de-enrolled, no further data with the associated device identifier is to be accepted. As another example, the de-enrollment command may be from an administrator device connected to the apparatus 10 via the network 100, such as if an administrator of the device as a service system intends to de-enroll a device remotely.

The de-enrollment command may also be generated automatically by the processor 25. For example, an enrollment system may provide enrollment data for a device which may be marked as active in the database 30. It is to be appreciated that if a device is enrolled and active, the database 30 would be showing the device to be associated with a user. Accordingly, receiving enrollment data for this device would indicate that a deactivation and/or de-enrollment had occurred and not entered into the database 30. This may occur if the device is re-assigned from a current user to a new user and not properly deactivated and de-enrolled prior to enrollment by the new user. Accordingly, upon receiving the re-enrollment command for an active device, the processor 25 may automatically generate a de-enrollment command.

At block 240, the processor 25 modifies the device identifier stored in the database 30 upon receipt of the de-enrollment command at block 230. The manner by which the device identifier is modified is not particularly limited. In the present example, the processor 25 generates a masked identifier associated with the device identifier and replaces the device identifier stored in the database 30 with the masked identifier.

In the present example, the device identifier may be an alphanumeric or text string and the masked identifier may be a different alphanumeric or text string. The generation of the masked identifier in this case may append a character to the device identifier. For example, the character may be a number or letter generated and/or assigned by a masking logic. For devices that may be enrolled and de-enrolled multiple times, the masking logic may generate numerical values in a chronological sequence at each de-enrollment. As another example, the masking logic may generate letters in a chronological sequence at each de-enrollment. Accordingly, the application of the masking logic to generate a sequence character at each de-enrollment may allow for the device identifier to be readily identified using the masking identifier. Therefore, the masked identifier may be readily associated with a specific device since the serial number appears in the masked identifier. In addition, the sequential nature of the appended character provides an indication of the sequence of each unique masked identifier associated with the device. Furthermore, in the present example, the device identifier is modified upon de-enrollment or re-enrollment of the device.

In other examples, the generation of the masked identifier may involve a masking operation where the device identifier is altered deterministically, such that the original device identifier may be regenerated from the masked identifier. As an example, the masked identifier may be randomly generated and the association with the device identifier may be stored in a lookup table to hide the identity of the device, for example due to privacy or other security considerations. In other examples, the generation of the masked identifier may apply a masking key to the device identifier to generate another text string as the masked identifier. The masking key may then be applied in reverse to regenerate the device identifier.

The modification of the device identifier may be used in the database 30 to preserve device history data and to provide for more efficient retrieval of information by reducing the likelihood of corruption in the database 30. For example, the database 30 may be a device reporting database as part of a device as a service system. The device reporting database collects elements of data pertinent to understand a device over time. This may provide a data-driven foundation upon which the state of a device may be understood so the appropriate action or reaction may happen as that device interacts with end users and/or other devices. Accordingly, the database 30 is a recordkeeping mechanism and a foundation for analysis, process modelling, and is a core system for other data processing uses of the device as a service system. Therefore, if data from two separate user enrollments with the same device identifier is mixed in the database 30, the data may be corrupted.

In the present example, the structure of the database 30 includes a spreadsheet table with rows and columns. In this example, the number of devices with information in the database 30 determines the number of rows in the spreadsheet table and the elements of data such as the device identifier and other information are stored in the columns. The number of rows will be further expanded by the number of events reported by each device report. Accordingly, the database 30 includes a row for each device managed by the apparatus 10 and a column which stores the device identifier. Additional rows and columns may be added to the database as additional devices and data elements are received.

In this example, the data received from the devices may form a data record. Devices may include a mechanism by which the elements of data are entered into the database 30. It is to be appreciated that the first data element associated with a device identifier in the device reporting system is enrollment data to be stored in an enrollment date field or column. Subsequently, other data elements associated with the device identifier may be stored in separate fields or columns of the database. The device identifier identifies that the data on that row of data belongs to a specific device. Another data element, such as the date the data was recorded may be the date the data is written into the database 30, which is helpful to understand the age of the data. Another data element may be the enrollment date associated with the device identifier and may be the first date the data was recorded for a device.

It is to be appreciated that devices may be enrolled, de-enrolled and re-enrolled. The concept of de-enrollment is a condition where the device changes one or more important features. For example, in a device as a service system, the de-enrollment may occur when a lease on a device ends and the device is returned to the provider. Subsequently, the returned device may be re-leased to another user and re-enrolled. Since the same physical device is used, the device identifier of the physical device does not change through the de-enrollment and re-enrollment process. The transfer of the device may also present privacy issues or other concerns with sharing data about the device from a prior user to the new user. Accordingly, distinctiveness of a device from one enrollment to another is maintained in the device reporting database.

Another example of de-enrollment occurs when the device is used in software quality testing of the device reporting system. In such cases, multiple de-enrollments and re-enrollments may be carried out to provide test cases without the need for multiple devices. Device reuse may achieve a balance between testing a wide variety of devices with the system while reducing costs associated with the use of a wide variety of devices to be purchased. Accordingly, without device reuse, the costs associated with device reporting system software quality testing in a device as a service system is increased. Accordingly, software testers de-enroll and re-enroll the same device many times over to simulate the effect of a wide variety of devices within the device reporting system. In this application of the reporting system, each enrollment may be considered as a test case. Since the device identifier of each physical device may not be changed, the software tester reuses the same device identifier for what is intended to be a different device. When a device identifier is re-used in the database 30, the re-enrollment may corrupt the values stored in the database 30 because the new test results may be mixed with the values from a prior test result.

The application of the method 200 to method to modify, generate, and transform data in large datasets may enhance the performance of centralized management systems, such as a device as a service system, due to efficiencies and capabilities that are not possible when separate databases and tables are maintained to preserve device history data. For example, the single database may be language independent to allow for compatibility with many different programming languages such that the data may be manipulated with the different programming languages in a faster and more efficient manner than when multiple databases that store information are to be cross referenced.

Figure 3:
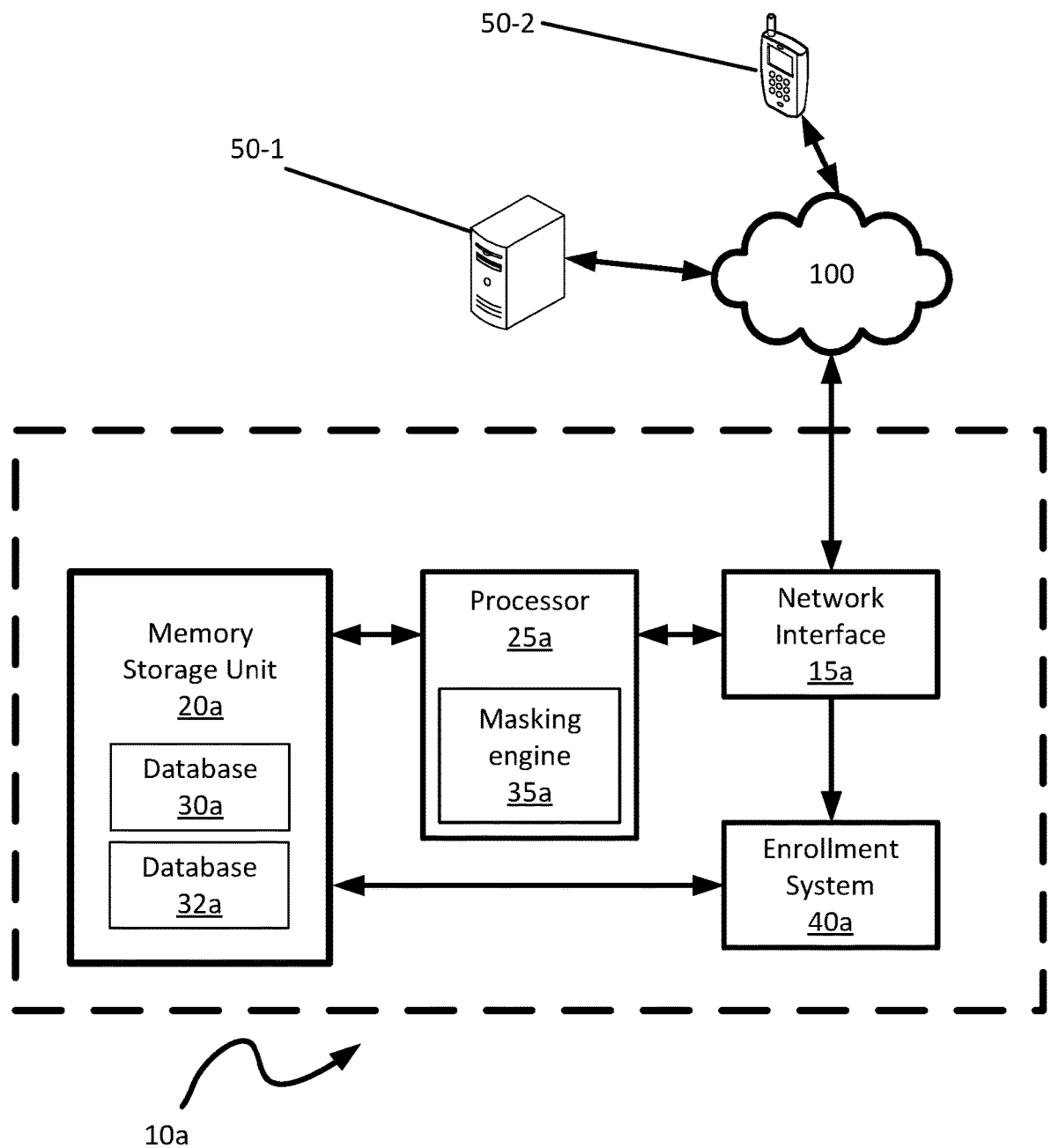
FIG. 3 is a block diagram of another example apparatus.

Referring to FIG. 3, another example of an apparatus to modify, generate, and transform data in large datasets is shown at 10a. Like components of the apparatus 10a bear like reference to their counterparts in the apparatus 10, except followed by the suffix "a". The apparatus 10a includes a network interface 15a, a memory storage unit 20a, a processor 25a, and an enrollment system 40a.

In the present example, the apparatus 10a operates a device as a service system. In particular, the device as a service system is an Internet of Things solution, where each device, user, and company are treated as components in a system that provides analytics-driven point of care. In particular, the apparatus 10a manages a plurality of devices 50-1 and 50-2 (generically, these devices are referred to herein as "device 50" and collectively they are referred to as "device 50", this nomenclature is used elsewhere in this description).

In this example, the devices 50 are enrolled with the enrollment system 40a. In the present example, the enrollment system 40a tracks the enrollment of the devices 50. The enrollment system 40a may maintain a separate database in the memory storage unit 20a to store enrollment data. Furthermore, although the present example shows the enrollment system 40a as a separate component, in other examples, the enrollment system 40a may be combined with the processor 25a and may be part of the same physical component such as a microprocessor configured to carry out multiple functions. Furthermore, the enrollment data generated by the enrollment system 40a may also be provided to the processor 25a to be added to the database 30a. However, the enrollment system 40a maintains a separate database 32a such that changes to the database 30a, which may be a device reporting database, does not impact the data in the database 32a.

Furthermore, in this example, the processor 25a includes a masking engine 35a to apply the masking logic. In the present example, masking engine 35a modifies the device identifier to generate a masked identifier. In this case, the masking engine appends a character to the device identifier. For example, the character may be a number or letter generated and/or assigned using masking logic. Accordingly, for devices 50 that may be enrolled and de-enrolled multiple times, the masking engine 35a may generate sequential numerical values in a chronological sequence at each de-enrollment. Accordingly, the masking engine 35a generates a sequence character for a device 50 each time it is de-enrolled to readily identify the device history data the masking identifier.

Referring to FIGS. 4A-C, an example of the flow of data elements is generally shown. FIG. 4A illustrates a table 600 showing a series of events 650-1, 650-2, 650-3, 650-4, and 650-5 received at the apparatus 10a from a device 50. It is to be understood that the table 600 does not represent the data stored in the database 30. Instead, the table 600 is used to show the raw data that was received by the network interface 15a over time from the device 50. Furthermore, the table 600 illustrates the data flow from one device with a device identifier "A123". It is to be appreciated that other data events with different device identifiers (i.e. from different devices) are likely to have been received at the apparatus 10. However, the other events have been filtered from this table for clarity.

The following discussion of table 600 may lead to a further understanding of the apparatus 10a as well as the method 200 and their various components. The table includes a plurality of columns to store data. In this example, the columns include a device identifier column 605, enrollment date column 610, date columns 615, a status column 620, and an owner name column 625.

The device identifier column 605 includes data that represent the device identifier of the device 50. For example, the device identifier may be the serial number of the physical device 50. It is to be understood that the device identifier is generally tied to a physical piece of hardware in a device as a service system, such as a laptop, smartphone, smartwatch, computer, tablet, appliance, medical device, or other consumer electronic device.

The enrollment date column 610 includes data representing the date that an enrollment of the device 50 occurred. In the present example of the apparatus 10a, the enrollment system 40a is separated from the device reporting system operated by the processor 25a. The enrollment data may be stored in the database 32a and copied into the table 600 for subsequent storage in the device reporting database 30a.

The date column 615 includes data to represent the date that on which the data element was received at the apparatus 10a from the device 50. It is to be understood that events other than enrollments may be sent to the apparatus 10a. For example, the event 650-2 is not an enrollment event. Instead, it is a change in status to "inactive".

The status column 620 includes data to represent the status of the device 50. In this example, the status is active or inactive. When the device 50 is enrolled, the status of the device is active. In contrast, when the device 50 is de-enrolled, the device 50 becomes inactive. As shown in the table 600, the device 50 may not be inactivated prior to the re-enrollment of the device 50. It is to be understood that when a device is re-enrolled, the prior active state is automatically inactivated and a new event 650 is generated. Referring to the present example, the enrollment event 650-1 activated the device 50. Subsequently, the device 50 was de-enrolled by the event 650-2. The device was re-enrolled in the event 650-3. Subsequently, two more re-enrollments occur in the events 650-4 and 650-5 without a de-enrollment event.

The name column 625 includes data to represent the name of the user in control of the device 50. In a device as a service system, the name column 625 may be used to track and manage devices that have been assigned to users.

Referring to FIG. 4B, the generation of the modified device identifier is illustrated in the table 601. In this example, the table 601 only considers events with distinct enrollment dates. In particular, since the table 600 illustrated two events 650-1 and with the 650-2, the earlier event 650-1 is selected and the event 650-2 is not considered. The modified identifier column 605' includes the modified identifier after the masking engine has been applied to the device identifiers. In particular, the modified identifier column 605' increments an appended sequence number to each of the device identifiers when the device 50 is enrolled.

In FIG. 4C, the device identifier column 605 is replaced with values from the modified device identifier column 605' as shown in the table 602. Since an event was not considered in table 601 when the assigning of the sequence number was discussed, the event has been re-inserted into the table 602 with the same modified device identifier as the previous enrollment in time.

This mechanism of maintaining the original device identifier may enable a reporting system to filter out all but the most recent device enrollment relatively easily. For example, a query may look for the period or dot and since the device identifiers in this example do not contain a period or dot, only the most recent device appears. If the full and complete history of all devices is required, a filter may be given where the period or dot and all characters to the right of the period or dot are removed as part of the final report. For example, "A123.1" may be modified to "A123" when the characters include the period and to the right of the period are removed. Accordingly, both the most recent and the full history of a given device may be provided.

It is to be recognized that features and aspects of the various examples provided above may be combined into further examples that also fall within the scope of the present disclosure.

What is claimed is:

1. An apparatus comprising:
 a network interface to receive enrollment data from a device, wherein the device is identified by a device identifier;
 a memory storage unit connected to the network interface, the memory storage unit to receive device history data associated with the device identifier when the device is enrolled, and the memory storage unit to maintain a database to store the device history data associated with the device identifier, wherein the device history data includes an indication of a past activation of the device, an indication of a past deactivation of the device, or both the indication of the past activation of the device and the indication of the past deactivation of the device; and
 a processor to receive a de-enrollment command associated with the device via the network interface, wherein the de-enrollment command causes the processor to modify the device identifier stored in the database as associated with the device history data to preserve the device history data during continued use of the device identifier, wherein the modification includes adding information to the otherwise unchanged device identifier.

2. The apparatus of claim 1, wherein the processor generates a masked identifier associated with the device identifier.

3. The apparatus of claim 2, wherein the masked identifier is searchable with the device identifier.

4. The apparatus of claim 3, wherein the device identifier is a first text string and the masked identifier is a second text string.

5. The apparatus of claim 4, wherein the second text string comprises the first text string with an appended character.

6. The apparatus of claim 5, wherein the appended character is generated with masking logic.

7. The apparatus of claim 6, wherein the masking logic generates numerical values in a chronological sequence.

8. A method comprising:
 receiving enrollment data from an enrollment system associated with a device, wherein the device is identified by a serial number;
 receiving device history data associated with the serial number from the device via a network interface, wherein the device history data includes an indication of a past activation of the device, an indication of a past deactivation of the device, or both the indication of the past activation of the device and the indication of the past deactivation of the device;
 storing the enrollment data and the device history data in a database;
 receiving a de-enrollment command for the device via the network interface, wherein the de-enrollment command includes the serial number; and
 modifying the serial number stored in the database with a processor when the de-enrollment command is received to preserve the device history data during continued use of the serial number, wherein the modification includes adding information to the otherwise unchanged device identifier.

9. The method of claim 8, wherein modifying the serial number comprises generating a masked identifier associated with the serial number.

10. The method of claim 9, wherein generating the masked identifier comprises appending a character to the serial number.

11. The method of claim 9, wherein generating the masked identifier comprises applying masking logic to the serial number.

12. The method of claim 11, wherein applying masking logic comprises generating a character, wherein the character is a sequence character.

13. A non-transitory machine-readable storage medium encoded with instructions executable by a processor, the non-transitory machine-readable storage medium comprising:
 instructions to receive enrollment data from a device via a network interface, wherein the device is identified by a device identifier, and wherein the enrollment data includes device history data associated with the device identifier, wherein the device history data includes an indication of a past activation of the device, an indication of a past deactivation of the device, or both the indication of the past activation of the device and the indication of the past deactivation of the device;

instructions to store the device history data in a database, wherein the device history data is associated with the device identifier;

instructions to receive a de-enrollment command having the device identifier; and instructions to modify the device identifier stored in the database with a processor when the de-enrollment command is received to preserve the device history data during continued use of the device identifier, wherein the modification includes adding information to the otherwise unchanged device identifier.

14. The non-transitory machine-readable storage medium of claim 13, further comprising instructions to modify the device identifier via application of masking logic to the device identifier.

15. The non-transitory machine-readable storage medium of claim 14, wherein the instructions to modify the device identifier comprising instructions to generate a sequence number to append to the device identifier.

* * * * *